(12) United States Patent
Carrard et al.

(10) Patent No.: US 8,785,537 B2
(45) Date of Patent: Jul. 22, 2014

(54) GLUE FOR REPAIR OR ATTACHMENT FREE OF ORGANOTIN

(75) Inventors: Jacqueline Carrard, Brie Comte Robert (FR); Virginie Cagan, Montcourt Fromonville (FR)

(73) Assignee: Bostik S.A., Courbevoie (FR)

( * ) Notice: Subject to any disclaimer, the term of this patent is extended or adjusted under 35 U.S.C. 154(b) by 273 days.

(21) Appl. No.: 13/384,784

(22) PCT Filed: Jul. 9, 2010

(86) PCT No.: PCT/FR2010/051455
§ 371 (c)(1),
(2), (4) Date: Mar. 14, 2012

(87) PCT Pub. No.: WO2011/010044
PCT Pub. Date: Jan. 27, 2011

(65) Prior Publication Data
US 2012/0165453 A1    Jun. 28, 2012

(30) Foreign Application Priority Data
Jul. 20, 2009  (FR) ...................................... 09 03551

(51) Int. Cl.
*C09J 11/04* (2006.01)
*C09J 133/10* (2006.01)

(52) U.S. Cl.
USPC ........... 524/427; 524/871; 524/874; 524/560; 524/562; 524/425; 524/493; 977/773; 977/902

(58) Field of Classification Search
USPC ......... 524/427, 871, 874, 560, 562, 425, 493; 977/773, 902
See application file for complete search history.

(56) References Cited

U.S. PATENT DOCUMENTS

| | | |
|---|---|---|
| 2005/0004327 A1 | 1/2005 | Ueda et al. |
| 2007/0219299 A1 | 9/2007 | Okamoto et al. |
| 2007/0287780 A1 | 12/2007 | Wakabayashi et al. |
| 2008/0033087 A1 | 2/2008 | Okamoto et al. |
| 2008/0076878 A1 | 3/2008 | Wakioka et al. |
| 2008/0194773 A1 | 8/2008 | Wakioka et al. |
| 2008/0287636 A1 | 11/2008 | Wakabayashi et al. |
| 2008/0319152 A1 | 12/2008 | Okamoto et al. |

FOREIGN PATENT DOCUMENTS

| | | | |
|---|---|---|---|
| EP | 1 445 283 A1 | | 8/2004 |
| EP | 1 746 133 A1 | * | 1/2007 |
| WO | WO 2007/093381 A1 | | 8/2007 |

OTHER PUBLICATIONS

International Search Report of PCT/FR2010/051455 (Sep. 24, 2010).

* cited by examiner

*Primary Examiner* — Robert D. Harlan
(74) *Attorney, Agent, or Firm* — Millen, White, Zalano & Branigan, P.C.

(57) ABSTRACT

The invention relates to an adhesive composition, including: 10 to 95% of a moisture cross-linkable polymer (A), the main chain includes 2 silyl terminal groupings, each of which includes at least one hydrolyzable group bonded to the silicon atom; 1 to 60% of a mineral filler (B) in the form of particles having a size of between 1 nm and 0.2 mm; and 0.2 to 7% of a crosslinking catalyst (C) consisting of titanium tetraisopropoxide. The invention also relates to the use of said composition as glue for repair or attachment.

14 Claims, No Drawings

GLUE FOR REPAIR OR ATTACHMENT FREE OF ORGANOTIN

The present invention relates to an adhesive composition comprising a moisture-crosslinkable polymer having terminal silyl groups, this composition exhibiting enhanced harmlessness and enhanced setting rate while providing high bonding performance. The present invention also pertains to the use of said composition as a fixing or repair glue.

Adhesive compositions based on polymer having terminal silyl groups are well known. Compositions of this kind are commonly available commercially and are appreciated by users, particularly as fixing or repair glues that contain no solvent.

In the operation of bonding between two substrates, said polymer reacts, at ambient temperature, with the moisture in the surrounding air, by way of the silyl group, which comprises at least one hydrolyzable group bonded to the silicon atom. This reaction leads to the crosslinking of the polymer chains by means of siloxane bonds, and to the creation of a three-dimensional network that forms an adhesive joint which unites the 2 substrates.

The effective formation of such a joint, and the corresponding time, necessitate the presence in practice of a crosslinking catalyst in said adhesive composition. Organotin compounds are often used for this purpose in commercial fixing or repair glues, such as, for example, dibutyltin dilaurate, dibutyltin diacetylacetonate or dioctyltin diacetylacetonate. For a number of years, however, concerns have arisen of the possible accumulation of such compounds in the ecosystem, resulting in a risk for public health.

Owing to this toxicity risk, therefore, it is desirable to avoid or reduce the presence of organotin compounds in adhesive compositions comprising a polymer having terminal silyl groups.

European patent application EP 1746134 describes a crosslinkable composition comprising an organic polymer containing a silicon-based reactive group, the crosslinking catalyst used in said composition comprising one or more compounds based on titanium, on aluminum and/or on zirconium. However, with the compositions specifically disclosed by this patent application, the skinover time, which corresponds to the polymer crosslinking time and hence to the setting time of the adhesive composition, is very high, and more specifically is greater than or equal to one hour.

Repair glues are widely used by individuals for the bonding of diverse articles, which have broken or become unstuck, composed of all sorts of materials, such as wood and its derivatives, rigid and flexible plastics, leather, rubber, marble, stone, fabrics, ceramic, earthenware, glass, metal, and tiling.

Fixing glues are also commonly used by consumers in their home improvement work, in order to fix a very wide variety of articles to floors, walls or ceilings and so to avoid the need for traditional mechanical fixing systems based, for example, on nails, screws and/or plugs. Examples of articles which may be fixed include baseboards, panels, brackets, spotlights, hooks, mirrors, hat pegs or coat hooks of various forms, curtain-rod supports, and even supports for racks or shelves intended for accommodating tableware, kitchen utensils or books. The nature of the substrate to which the article may be fixed is itself very varied; particular substrates include ceramic tiles or plaster tiles, concrete, fibrocement, or else wood.

For these applications as fixing or repair glues, it is very important to have an adhesive composition which, from the point at which it is contacted with articles to be assembled, after glue spreading, ensures their immediate holding by virtue of a very short setting time, thereby avoiding manual holding of the articles or else the placement of a clamp or props. The adhesive composition thus employed is required, moreover, to ensure satisfactory cohesion of the adhesive joint produced, which guarantees the integrity of the resulting assembly.

The aim of the present invention is therefore to provide an adhesive composition comprising a moisture-crosslinkable polymer having terminal silyl groups, said composition using as its crosslinking catalyst a compound other than an organotin compound, and at the same time providing an enhanced setting time and also the cohesion required for use as a fixing or repair glue.

It has now been found that this aim can be achieved in its entirety or in part by means of the adhesive composition described below.

The present invention accordingly provides an adhesive composition comprising:
- from 10% to 95% of a moisture-crosslinkable polymer (A) with a main chain comprising 2 terminal silyl groups each comprising at least one hydrolyzable group bonded to the silicon atom;
- from 1% to 60% of a mineral filler (B) in the form of particles with a size of between 1 nm and 0.2 mm, preferably between 10 nm and 0.01 mm; and
- from 0.2% to 7% of a crosslinking catalyst (C) composed of titanium tetraisopropoxide.

The reason is that it has been found that the incorporation of this specific titanium compound (C) results, in contrast to other titanium compounds, in an adhesive composition having an enhanced skinover time, of in general advantageously less than one hour, preferably less than 30 minutes, and more preferably less than 15 minutes. This composition, moreover, offers adhesive joint cohesion suitable for its use as a fixing or repair glue.

In the present text, unless indicated otherwise, the percentages used to represent the amounts of ingredients in the composition of the invention correspond to weight/weight percentages. Furthermore, when it is indicated that the composition comprises a certain amount of "a" component (A) or (B), the article "a" signifies that "one or more" components (A) and/or (B) may be included in said composition.

The main chain of the polymer (A) is generally selected from the following polymer chains:
- (A1) polyoxyalkylenes (or polyethers), such as, for example, polyoxyethylenes and polyoxypropylenes;
- (A2) polyurethanes or polyureas obtained by condensing a polyol (particularly a polyether and/or polyester polyol) or a polyamine with polyisocyanates;
- (A3) homopolymers and copolymers obtained from:
  at least one alkyl(meth)acrylate monomer comprising an alkyl radical having a number of carbon atoms of between 1 and 15, preferably between 1 and 10; and optionally
  other monomers, such as styrene derivatives, vinyl ethers, (meth)acrylic acids or other polyunsaturated derivatives, it being possible for these other monomers to be used in amounts of up to 50% by weight relative to the entirety of the monomers.

The main chain of the polymer (A) is joined by each of its two ends to a silyl group comprising at least one hydrolyzable group bonded to the silicon atom.

Said silyl group is preferably an alkoxysilane radical having the formula:

$$-Si(R^1)_p(OR^2)_{3-p} \qquad (I)$$

in which:
R$^1$ and R$^2$, which are identical or different, each represent a linear or branched alkyl radical of 1 to 4 carbon atoms, with the possibility, when there are two or more radicals R$^1$ or R$^2$, for them to be identical or different;
p is an integer equal to 0, 1 or 2.

When the main chain of the polymer (A) is (A1), the alkoxysilane radical may be joined to it directly by its available bond or else indirectly via a urethane function and a group comprising a divalent hydrocarbon radical, preferably an alkylene radical such as, for example, the radicals of formula:

—CH$_2$— or

—CH$_2$—CH$_2$—CH$_2$—.

The alkoxysilane radical is preferably selected from the radicals of the following formulae:

Si(OCH$_3$)$_3$, —Si(CH$_3$)(OCH$_3$)$_2$, —Si(OCH$_2$CH$_3$)$_3$, —Si(CH$_3$)(OCH$_2$CH$_3$)$_2$.

The preparation of the polymer (A) is known to the skilled person. It is described, for example, depending on the nature of the main chain, by the following patents:
when the main chain is (A1): U.S. Pat. No. 3,971,751, U.S. Pat. No. 4,323,488, EP 1038901;
when the main chain is (A2): U.S. Pat. No. 3,632,557, U.S. Pat. No. 3,979,344, U.S. Pat. No. 5,298,572, WO 93/05089, EP 770633, EP 1178069;
when the main chain is (A3): U.S. Pat. No. 4,593,068, U.S. Pat. No. 4,910,255, U.S. Pat. No. 6,441,101, EP 1153942.

Furthermore, these polymers (A) are commonly available commercially. Mention may accordingly be made, in the case of a main chain (A1), of the following:
Geniosil® STP-E 10 sold by Wacker, in which each of the 2 terminal silyl groups has the formula —Si(CH$_3$)(OCH$_3$)$_2$ and is linked via the group —O—CO—NH—CH$_2$— to one end of the main chain;
Desmoseal® S XP 2636 sold by Bayer MaterialScience;
Kaneka Silyl® MAX 602 sold by Kaneka, which is a composition comprising about 55% of polymer (A) having a main chain (A1) and about 45% of an acrylic copolymer comprising an acrylic monomer having a pendent group comprising a silyl radical.

Mention may also be made, in the case of a main chain (A2), of:
STPU100 sold by Wacker.

According to one preferred embodiment, a polymer (A) having a main chain (A1) is employed in the composition according to the invention.

According to another preferred embodiment, a polymer (A) having a main chain (A2) is employed in the composition according to the invention.

The mineral filler (B) employed in the adhesive composition according to the invention has the function of reinforcing the adhesive joint obtained after crosslinking, and is selected, for example, from calcium carbonate, magnesium carbonate, calcium oxide, hydrated or anhydrous silicic acid, silica, especially fumed silica, calcium silicate, titanium oxide, clay, talc, and carbon black.

A mineral filler selected from calcium carbonate or a fumed silica is preferred.

Titanium tetraisopropoxide (C) is also denoted by the name tetraisopropyl titanate or else by the abbreviation TIPT, and has the formula Ti[O—CH(CH$_3$)$_2$]$_4$. In the adhesive composition according to the invention, it is used as a crosslinking catalyst for the polymer (A), and it is commonly available commercially, for example from Aldrich or Borica.

According to one preferred embodiment, the adhesive composition according to the invention comprises from 15% to 80% of the polymer (A), from 2% to 55% of mineral filler, and from 0.5% to 5% of titanium tetraisopropoxide (C).

The adhesive composition according to the invention may further comprise various additives such as:
up to 30% of a plasticizer selected, for example, from phthalates or mineral oils of petroleum origin;
up to 15% of an adhesion promoter, which may be 3-aminopropyltrimethoxysilane (or AMMO) or else an oligomer with a molecular weight of between 500 and 5000 Da which is obtainable by oligomerizing a vinyl derivative of an alkoxyalkylsilane, such as, for example, Dynasilan® 6490, which is a vinyltrimethoxysilane oligomer sold by Degussa and having a molar mass of approximately 900 Da;
up to 5% of a siccative consisting preferably of a hydrolyzable alkoxysilane derivative and more preferably of a trimethoxysilane derivative. This siccative advantageously prolongs the storage life of the composition according to the invention during transport and storage prior to its use; mention may be made, for example, of the vinyltrimethoxysilane available under the trade name Dynasylan® VTMO from Degussa;
up to 30% of a polymer other than (A), for example an acrylic polymer or an acrylic copolymer comprising an acrylic monomer having a pendent group comprising a silyl radical;
UV stabilizers and thickeners.

The adhesive composition according to the invention is advantageously free from significant amounts of organotin compound, as a result of the fact that the crosslinking catalyst (C) is itself not of that type. However, the composition may contain such compounds optionally used in the industrial manufacture of the polymers (A). Any such amount of organotin compounds in the adhesive composition according to the invention, however, is less than 0.01%, preferably less than 0.005%.

The adhesive composition according to the invention is prepared by simple mixing of its ingredients.

The present invention likewise pertains to the use of the adhesive composition as defined above as a fixing or repair glue.

The examples which follow are given purely to illustrate the invention and should not be interpreted as limiting the scope thereof.

Example 1

The adhesive composition featuring in the table below is prepared by simple mixing of the ingredients indicated.

Its setting time and the cohesion of the adhesive joint obtained after its crosslinking are evaluated by measurement, respectively, of the skinover time and of the shear strength, in accordance with the tests described below.

Skinover Time

This test is carried out in a controlled atmosphere at a temperature of 20° C. and a relative humidity of approximately 60%.

The adhesive composition is applied, using a wooden spatula, in the form of a thin film with a thickness of approximately 0.5 mm, to a glass slide with a length of 76 mm and a width of 26 mm.

Immediately after application of said film, a stopwatch is started and an examination is made every minute, by gentle pressing with the finger, as to whether the film is dry or whether a residue of adhesive composition is transferred to the finger.

The skinover time is the time after which the film of adhesive composition is dry and there is no longer any transfer of glue residue to the finger.

The result is indicated in minutes in the table below.

Shear Strength of the Adhesive Joint According to Standard EN 1465

A measurement is made of the shear strength that leads to failure of the adhesive joint.

The principle of this measurement is as follows:
a test specimen of standard shape, composed of the crosslinked adhesive composition between 2 rigid polycarbonate supports, which has been left in place for 7 days following its preparation at ambient temperature and in an atmosphere of 65% relative humidity, is stressed in a tensile testing machine, the movable jaws of which move at constant speed, and then
the stress applied at the moment when the test specimen fails is recorded.

The result is indicated in daN/cm² in the table below.

Examples 2 to 5

Example 1 is repeated by preparing the compositions that feature in the table, which also indicates the corresponding results obtained for the skinover time and the shear strength.

In example 4, the 5% of Kaneka Silyl® MAX 602 comprises around 3% of moisture-crosslinkable polymer (A) having a main chain (A1).

Comparative Example

Example 2 is repeated by preparing the composition in the table, which is obtained by replacing the TIPT by the same amount of titanium diisopropoxide bis(ethyl acetoacetate). This latter compound is available, for example, from Aldrich under the name titanium diisopropoxide bis(ethyl acetoacetate) or from Matsumoto under the name Orgatix® TC-750.

The skinover time is double that of example 2.

The invention claimed is:

1. An adhesive composition comprising:
   from 10% to 95% of a moisture-crosslinkable polymer (A) with a main chain comprising 2 terminal silyl groups each comprising at least one hydrolyzable group bonded to the silicon atom;
   from 1% to 60% of a mineral filler (B) in the form of particles with a size of between 1 nm and 0.2 mm; and
   from 0.2% to 7% of a crosslinking catalyst (C) composed of titanium tetraisopropoxide.

2. The adhesive composition as claimed in claim 1, wherein the main chain of the polymer (A) is:
   (A1) polyoxyalkylenes;
   (A2) polyurethanes or polyureas obtained by condensing a polyol or a polyamine with polyisocyanates;
   (A3) homopolymers and copolymers obtained from:
      at least one alkyl(meth)acrylate monomer comprising an alkyl radical having a number of carbon atoms of between 1 and 15, and optionally
      other monomers, it being possible for these other monomers to be used in amounts of up to 50% by weight relative to the entirety of the monomers.

3. The adhesive composition as claimed in claim 1, wherein the silyl group is an alkoxysilane having the formula:

$$-Si(R^1)_p(OR^2)_{3-p} \qquad (I)$$

in which:
$R^1$ and $R^2$, which are identical or different, each represent a linear or branched alkyl radical of 1 to 4 carbon atoms, with the possibility, when there are two or more radicals $R^1$ or $R^2$, for them to be identical or different;
p is an integer equal to 0, 1 or 2.

4. The adhesive composition as claimed in claim 3, wherein when the main chain of the polymer (A) is (A1), the alkoxysilane radical is joined to said chain directly by its available bond or indirectly via a urethane function and a group comprising an alkylene radical of formula:

$$-CH_2-$$

or $$-CH_2-CH_2-CH_2-.$$

5. The adhesive composition as claimed in claim 1, wherein the alkoxysilane radical is of the following formulae:

| | Amount in % | | | | | |
|---|---|---|---|---|---|---|
| Ingredients | Example 1 | Example 2 | Example 3 | Example 4 | Example 5 | Comparative example |
| (A1) Geniosil ® STP-E 10 | 20 | 95 | — | — | — | 95 |
| (A1) Desmoseal ® S XP 2636 | — | — | 75 | 18 | — | — |
| (A1) Kaneka Silyl ® MAX 602 | — | — | — | 5 | — | — |
| (A2) STPU100 | — | — | — | — | 93 | — |
| (B) Calcium carbonate | 30 | — | — | 53.9 | — | — |
| (B) Fumed silica | 15 | 2 | 10 | — | 2 | 2 |
| (C) TIPT | 0.5 | 2 | 5 | 1.1 | 2 | — |
| Orgatix ® TC-750 | — | — | — | — | — | 2 |
| Phthalate | 28.5 | — | — | 20 | — | — |
| Dynasilan ® 6490 | 5 | — | 10 | — | — | — |
| AMMO | — | — | — | 0.5 | 2 | — |
| Dynasylan ® VTMO | 1 | 1 | — | 1.5 | 1 | 1 |
| Skinover time (in minutes) | 25 | 6 | 5 | 20 | 10 | 12 |
| Shear strength (in daN/cm²) | 5 | 8 | 14 | 10 | 12 | 10 |

—Si(OCH$_3$)$_3$, —Si(CH$_3$)(OCH$_3$)$_2$, —Si(OCH$_2$CH$_3$)$_3$ or —Si(CH$_3$)(OCH$_2$CH$_3$)$_2$.

6. The adhesive composition as claimed in claim 1, wherein the main chain of the polymer (A) is (A1).

7. The adhesive composition as claimed in claim 1, wherein the main chain of the polymer (A) is (A2).

8. The adhesive composition as claimed in claim 1, wherein the mineral filler is calcium carbonate or a fumed silica.

9. The adhesive composition as claimed in claim 1, comprising from 15% to 80% of the polymer (A), from 2% to 55% of mineral filler, and from 0.5% to 5% of titanium tetraisopropoxide (C).

10. A glue comprising the adhesive composition as defined in claim 1 and conventional additives.

11. The adhesive composition as claimed in claim 1, wherein the mineral filler particles have a size of 10 nm to 0.01 mm.

12. The adhesive composition as claimed in claim 2, wherein (A2) is a polyether or polyester polyol.

13. The adhesive composition as claimed in claim 2, wherein alkyl radical in (A3) has 1-10 carbon atoms.

14. The adhesive composition as claimed in claim 2, wherein the other monomers are styrenes, vinyl ethers, (meth) acrylic acids or polyunsaturated monomers.

\* \* \* \* \*